United States Patent
Pang et al.

(10) Patent No.: US 8,578,164 B2
(45) Date of Patent: Nov. 5, 2013

(54) METHOD OF ONE-WAY ACCESS AUTHENTICATION

(75) Inventors: Liaojun Pang, Xi'an (CN); Jun Cao, Xi'an (CN); Manxia Tie, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 310 days.

(21) Appl. No.: 12/741,567

(22) PCT Filed: Nov. 7, 2008

(86) PCT No.: PCT/CN2008/072979
§ 371 (c)(1),
(2), (4) Date: May 5, 2010

(87) PCT Pub. No.: WO2009/067901
PCT Pub. Date: Jun. 4, 2009

(65) Prior Publication Data
US 2010/0268954 A1 Oct. 21, 2010

(30) Foreign Application Priority Data

Nov. 8, 2007 (CN) .......................... 2007 1 0019023

(51) Int. Cl.
*G06F 21/00* (2006.01)
(52) U.S. Cl.
USPC ........... 713/171; 713/165; 713/166; 713/167; 713/168; 713/169; 713/170
(58) Field of Classification Search
USPC ................................................ 713/165–171
See application file for complete search history.

(56) References Cited

U.S. PATENT DOCUMENTS

| 6,272,321 B1 | 8/2001 | Bruhnke et al. |
| 6,426,692 B1 | 7/2002 | Bruhnke et al. |

(Continued)

FOREIGN PATENT DOCUMENTS

| CN | 1767429 A | 5/2006 |
| CN | 1777102 A | 5/2006 |

(Continued)

OTHER PUBLICATIONS

Korean Office Action regarding Application No. 10-2010-7012237, dated Jun. 28, 2011. Translation provided by Unitalen Attorneys at Law.

(Continued)

*Primary Examiner* — Ghazal Shehni
(74) *Attorney, Agent, or Firm* — Harness, Dickey & Pierce, P.L.C.

(57) ABSTRACT

A method of one-way access authentication is disclosed. The method includes the following steps. According to system parameters set up by a third entity, a second entity sends an authentication request and key distribution grouping message to a first entity. The first entity verifies the validity of the message sent from the second entity, and if it is valid, the first entity generates authentication and key response grouping message and sends it to the second entity, which verifies the validity of the message sent from the first entity, and if it is valid, the second entity generates the authentication and key confirmation grouping message and sends the message to the first entity. The first entity verifies the validity of the authentication and key conformation grouping message, and if it is valid, the authentication succeeds and the key is regarded as the master key of agreement.

18 Claims, 1 Drawing Sheet

(56) References Cited

U.S. PATENT DOCUMENTS

| | | | |
|---|---|---|---|
| 6,510,517 | B1 | 1/2003 | Bruhnke et al. |
| 8,225,092 | B2 | 7/2012 | Lal et al. |
| 2006/0155993 | A1* | 7/2006 | Busboon ............. 713/169 |
| 2007/0028104 | A1* | 2/2007 | Cohen et al. .......... 713/170 |
| 2007/0067618 | A1* | 3/2007 | Sandhu et al. ......... 713/155 |
| 2007/0234410 | A1 | 10/2007 | Geller |

FOREIGN PATENT DOCUMENTS

| | | | |
|---|---|---|---|
| CN | 1949709 | A | 4/2007 |
| CN | 101159639 | A | 4/2008 |
| CN | 101640893 | A | 2/2010 |
| JP | 4117826 | A | 4/1992 |
| JP | 2001500685 | A | 1/2001 |
| JP | 2006025298 | A | 1/2006 |
| KR | 20010079161 | A | 8/2001 |
| WO | WO-2005/006629 | A2 | 1/2005 |
| WO | WO-2006086932 | A1 | 8/2006 |

OTHER PUBLICATIONS

Russian Office Action regarding Application No. 2010122598, dated Jul. 21, 2011. Translation provided by Unitalen Attorneys at Law.

IEEE Standard for Local and metropolitan area networks. Part 16: Air Interface for Fixed and Mobile Broadband Wireless Access Systems. Amendment 2: Physical and Medium Access Control Layers for Combined Fixed and Mobile Operation in Licensed Bands and Corrigendum 1. IEEE Computer Society and the IEEE Microwave Theory and Techniques Society. Sponsored by the LAN/MAN Standards Committee. Feb. 28, 2006.

D.W. Davies and W.L. Price. "Network Security." Nikkei McGraw-Hill. First Edition, First Print. Japan. Dec. 5, 1985. pp. 126-129. Translation provided by Unitalen Attorneys at Law.

"Survey on 'Status of Identity Authentication Technologies.'" Mar. 2003. Security Center of Information-technology Promotion Agency, Japan. Translation provided by Unitalen Attorneys at Law.

First Japanese Office Action regarding Application No. 2010-532413, mailed Oct. 9, 2012. Summary provided by Unitalen Attorneys at Law.

* cited by examiner

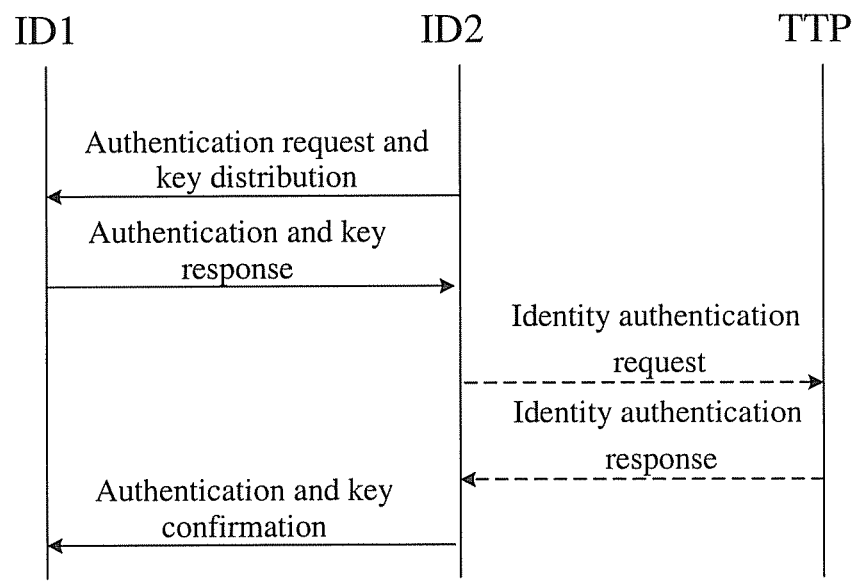

METHOD OF ONE-WAY ACCESS AUTHENTICATION

The present application claims priority to Chinese patent application No. 200710019023.7, entitled "A METHOD OF ONE-WAY ACCESS AUTHENTICATION" and filed in the China Patent Office on Nov. 8, 2007, the contents of which are incorporated herein by reference in their entireties.

FIELD OF THE INVENTION

The present application relates to the wireless communication technical field, and in particular to a method of one-way access authentication.

BACKGROUND OF THE INVENTION

Before secure communication of Radio Frequency Identification (RFID), it is necessary to effectively solve the problem of security authentication and key agreement between a RFID reader and a RFID electronic tag. In RFID, because the performance of the electronic tag is poor and the computation and communication capabilities are weak in some application scenarios, it only needs to perform one-way authentication on the electronic tag in such scenarios. As such, because in some special application scenarios of a wireless network, a network access point or a base station often has to authenticate only a mobile terminal, a safe one-way authentication protocol is also necessary in such scenarios.

The US IEEE proposed IEEE 802.11 standard to achieve security of a wireless local area network by using WEP protocol, and subsequently proposed 802.11i standard to relieve security vulnerabilities occurring in Wired Equivalent Privacy (WEP) protocol and support one-way authentication of a mobile terminal by an access point. Meantime, the US IEEE proposed IEEE 802.16 standard to achieve security of a wireless metropolitan area network and provide one-way authentication of a mobile terminal by a base station. Then IEEE802.16e standard was proposed by reference to the 802.11i standard and improved the IEEE 802.16 standard.

However, the inventor found in research that the existing one-way authentication methods cannot achieve direct one-way authentication of the mobile terminal by the base station or the access point, but instead, all these methods achieve the one-way authentication based on an authentication server. That is, when the base station or the access point performs one-way authentication on the mobile terminal, a secure channel needs to be established in advance between the access point and the authentication server or between the base station and the authentication server by means of other security protocol(s), and then the authentication server implements the one-way authentication between the base station or the access point and the mobile terminal. When something is wrong with the security of the secure channel, the reliability of the one-way authentication will be affected. In addition, when a new base station or access point is added into a network system, a secure channel between the base station and the authentication server or between the access point and the authentication server needs to be established manually. This is disadvantageous for the extension of the network system.

SUMMARY OF THE INVENTION

Embodiments of the present invention provide a method of one-way access authentication so as to ensure reliability of the one-way authentication.

An embodiment of the present invention discloses a method of one-way access authentication which includes: sending, by a second entity, an authentication request and key distribution packet to a first entity according to system parameters pre-set up by a third entity, and verifying, by the first entity, whether the authentication request and key distribution packet is valid; generating, by the first entity, an authentication and key response packet and sending by the first entity the authentication and key response packet to the second entity when the authentication request and key distribution packet is valid, and verifying, by the second entity, whether the authentication and key response packet is valid; generating, by the second entity, an authentication and key confirmation packet and sending by the second entity the authentication and key confirmation packet to the first entity when the authentication and key response packet is valid, and verifying, by the first entity, whether the authentication and key confirmation packet is valid; and determining that the authentication is successful and the key serves as an agreed master key when the authentication and key confirmation packet is valid.

Preferably, the verifying by the first entity whether the authentication request and key distribution packet is valid includes: obtaining a decryption key and an integrity check key from a key ciphertext CKey field of the authentication request and key distribution packet by using a secret data SData field of the authentication request and key distribution packet and a private key of the first entity; obtaining a second message integrity check code by using the integrity check key; and determining whether the second message integrity check code and a first message integrity check code in the authentication request and key distribution packet are identical.

Preferably, the verifying by the first entity the validity of the authentication and key confirmation packet includes: determining whether a first random number used by the second entity in the authentication and key confirmation packet is a random number generated by the first entity, and determining whether a third message integrity check code in the authentication and key confirmation packet is valid when it is determined that the first random number is a random number generated by the first entity.

Preferably, the first entity includes an electronic tag or a mobile terminal.

Preferably, the second entity includes a reader, an access point or a base station.

An embodiment of the present invention discloses a method of one-way access authentication which includes: sending, by a second entity, an authentication request and key distribution packet to a first entity according to system parameters pre-set up by a third entity, and verifying, by the first entity, whether the authentication request and key distribution packet is valid; generating, by the first entity, an authentication and key response packet and sending by the first entity the authentication and key response packet to the second entity when the authentication request and key distribution packet is valid, and verifying, by the second entity, whether the authentication and key response packet is valid; sending, by the second entity, an identity authentication request packet to the third entity when the authentication and key response packet is valid, and verifying, by the third entity, the validity of identity of the first entity and sending by the third entity an identity authentication response packet to the second entity; verifying, by the second entity, whether the identity of the first entity is correct according to the identity authentication response packet; generating, by the second entity, an authentication and key confirmation packet and sending by the second entity the authentication and key confirmation packet to the first entity when the identity of the first entity is correct, and verifying, by the first entity, whether the authentication and key confirmation packet is valid; and determining that the authentication is successful and the key serves as an agreed master key when the authentication and key confirmation packet is valid.

Preferably, the verifying by the first entity whether the authentication request and key distribution packet is valid includes: obtaining a decryption key and an integrity check key from a key ciphertext CKey field of the authentication request and key distribution packet by using a secret data SData field of the authentication request and key distribution packet and a private key of the first entity; obtaining a second message integrity check code by using the integrity check key; and determining whether the second message integrity check code and a first message integrity check code in the authentication request and key distribution packet are identical.

Preferably, the verifying by the first entity whether the authentication and key confirmation packet includes: determining whether a first random number used by the second entity in the authentication and key confirmation packet is a random number generated by the first entity, and determining whether a third message integrity check code in the authentication and key confirmation packet is valid when it is determined that the first random number is a random number generated by the first entity.

Preferably, the first entity includes an electronic tag or a mobile terminal.

Preferably, the second entity includes a reader, an access point or a base station.

It can be seen from the above embodiments of the present invention that, the authentication between the first entity and the second entity need not to pass through the authentication server, no secure channel needs to be established between the third entity and the first entity and between the third entity and the first entity, and the first entity and the second entity can implement the one-way authentication directly. In addition, combining an identity-based public key mechanism with a background identity validity authentication mechanism of WLAN Authentication and Privacy Infrastructure (WAPI) further provides the following advantages: 1. The maintenance workload is low since the present invention is based on an identity public key mechanism and does not need to maintain a public key infrastructure (PM) like the conventional public key; 2. Communication overhead is saved because no digital certificate needs to be transferred in the course of authentication, thus saving communication overhead; 3. The incorporation of the identity authentication function of the WAPI mechanism can avoid the disadvantage that it is difficult to perform identity validity verification in the identity-based public key mechanism; 4. Being different from the WAPI, in Trusted Third Party (TTP) signature of the identity verification process, both a conventional public key algorithm and an identity-based public key algorithm can be utilized so that the implementation of the signature is more flexible; and 5. By using bilinear pairings on an elliptic curve, the length of security data can be shortened without lowing security, thus greatly enhancing computation and communication performance.

BRIEF DESCRIPTIONS OF THE DRAWINGS

FIG. 1 is a flowchart of a one-way access authentication method according to an embodiment of the present invention.

DETAILED DESCRIPTIONS OF THE EMBODIMENTS

The method of the present invention is implemented through a trusted third party TTP. The trusted third party may be an authentication server or any other apparatus that can implement the authentication function. The trusted third party is responsible for the processes of physical authentication of the identity of a user entity, generation of system parameters and establishment of user parameters.

FIG. 1 illustrates a flowchart of a one-way access authentication method according to an embodiment of the present invention. The specific implementation method is as follows.

Step 1): The trusted third party sets up system parameters which comprise: two q-order cyclic groups $(G_1, +)$ and $(G_2, \cdot)$, a generator P of $G_1$, a bilinear map e of $G_1$ and $G_2$ which is e: $G_1 \times G_1 \to G_2$, a randomly selected trusted third party private key $S_{TTP} \epsilon Z^*_q$, and a corresponding public key $Q_{TTP} = S_{TTP} P \epsilon G_1$.

Here, the identity IDi of an entity user i is a public key of the entity user, and a corresponding private key of the entity user is $S_i = S_{TTP} ID_1$, wherein i=1, 2.

The above step is only executed when the one-way authentication is firstly applied. When the system parameters have already been established, the step need not to be repeated in the subsequent repetitive applications of the one-way authentication.

Step 2): A second entity sends an authentication request and key distribution packet to a first entity. The first entity verifies whether the packet sent from the second entity is valid. If the packet is valid, the first entity generates an authentication and key response packet and sends the packet to the second entity.

In the above step 2), the authentication request and key distribution packet sent by the second entity to the first entity consists of the following fields:

| ID1 | ID2 | N2 | SData | CKey | MIC1 |

Here,

ID1 field indicates identity information of the first entity;

ID2 field indicates identity information of the second entity;

N2 field indicates a random number generated by the second entity;

Secret data SData field is obtained by the second entity by selecting a secret random number r and computing r·P;

Key ciphertext CKey field encapsulates the ciphertext of a key Key to be sent to the first entity by the second entity, i.e. CKey=$E_k$(Key) where the encryption key k is derived from $r \cdot Q_{TTP} \cdot ID_1$, a portion of the derived result is used as the encryption key, and another portion of the derived result is used as an integrity key; and MIC1 field indicates a message integrity check code obtained for the CKey field and all the fields before the CKey field.

When the first entity receives the authentication request and key distribution packet sent from the second entity, it computes $r \cdot P \cdot S_1$ by using the SData field in the packet and its own private key $S_1$. The first entity then derives from the computation result a decryption key and a second integrity check key respectively corresponding to the encryption key and the first integrity check key, computes a new MIC1' field by using the second integrity check key, and compares the new MIC1' field with the MIC1 in the authentication request and key distribution packet. If they are different, the first entity discards the packet. If they are identical, the first entity decrypts the CKey field by using the decryption key to obtain the key Key, and derive a new third integrity check key by using the key Key. The process then proceeds to step 3).

Step 3): The first entity generates an authentication and key response packet and sends the packet to the second entity. The second entity verifies whether the packet sent from the first entity is valid. If the packet is valid, the second entity generates an authentication and key confirmation packet and sends the packet to the first entity.

In the above step 3), the authentication and key response packet sent by the first entity to the second entity consists of the following fields:

| ID1 | ID2 | N1 | N2' | MIC2 |
| --- | --- | --- | --- | --- |

Here,

ID1 field indicates identity the information of the first entity;

ID2 field indicates the identity information of the second entity;

N1 field indicates a random number generated by the first entity;

N2' field indicates a random number used by the first entity; and

MIC2 field indicates a message integrity check code obtained for the N2 field and all the fields before the N2 field by using the third integrity check key derived from the key Key.

Step 4): When the first entity receives the authentication and key confirmation packet, it verifies whether the packet is valid. If the packet is valid, the authentication is successful and the key Key serves as an agreed master key.

In the above step 4), the authentication and key confirmation packet sent by the second entity to the first entity consists of the following fields:

| ID1 | ID2 | N1' | MIC3 |
| --- | --- | --- | --- |

Here,

ID1 field indicates the identity information of the first entity;

ID2 field indicates the identity information of the second entity;

N1' field indicates a random number used by the second entity; and

MIC3 field indicates a message integrity check code obtained for the N1 field and all the fields before the N1 field by using the third integrity check key derived from the key Key.

After the first entity receives the authentication and key confirmation packet sent from the second entity, it determines whether the random number N1' in the packet used by the second entity is a random number generated by the first entity itself. If the random number is not a random number generated by itself, the first entity discards the packet. If the random number is a random number generated by itself, the first entity determines whether the MIC3 field is valid by using the new integrity check key 3. If is the MIC3 field is invalid, the first entity discards the packet. If the MIC3 field is valid, the authentication succeeds and the key Key serves as an agreed master key.

In order to further enhance security, when the second entity receives the authentication and key response packet sent from the first entity, it may further perform an identity validity verification for the first entity, and send the authentication and key confirmation packet to the first entity after the identity verification for the first entity passes. In this case, there is further comprised between step 3) and step 4):

Step 21): The second entity sends an identity authentication request packet to a trusted third party which verifies the identity validity of the first entity.

In the above step 21), the identity authentication request packet consists of the following fields:

| ID2 | TTP | ID1 | N1 | N2 |
| --- | --- | --- | --- | --- |

Here,

ID2 field indicates the identity information of the second entity;

TTP field indicates a trusted third party responsible for verifying the identity validity of other devices;

ID1 field indicates the identity information of the first entity;

N1 field indicates a random number generated by the first entity; and

N2 field indicates a random number generated by the first entity.

Step 31): The trusted third party generates an identity authentication response packet based on the verification result, and sends the generated packet to the second entity. The second entity verifies whether the identity of the first entity is correct based on the identity authentication response packet. If the identity of the first entity is correct, the process proceeds to step 3).

In the above step 31), the identity authentication response packet sent by the trusted third party to the second entity consists of the following fields:

| ID1 | ID2 | TTP | N1 | N2 | RES1 | SigTTP |
| --- | --- | --- | --- | --- | --- | --- |

Here,

ID1 field indicates the identity information of the first entity;

ID2 field indicates the identity information of the second entity;

TTP field indicates a trusted third party responsible for verifying the identity validity of other devices;

N1 field indicates a random number generated by the first entity;

N2 field indicates a random number generated by the second entity;

RES1 field indicates the result of the verification performed by the TTP on the validity of the identity of the first entity; and SigTTP field indicates the digital signature performed by the TTP on the RES1 field and all the fields before the RES1 field. The signature can be either a conventional PKI-based signature or an identity-based signature.

When the trusted third party receives the identity authentication request packet sent from the second entity, it verifies the identity of the first entity, encapsulates the verification result into the identity authentication response packet, and sends the identity authentication response packet to the second entity. The authentication response packet and the identity authentication request packet appear in pairs.

By using the RES1 field in the identity authentication response packet, the second entity can determine the validity of the identity of the first entity.

Through the above process, the one-way authentication of the second entity for the first entity is implemented, and a shared master key Key is created.

When the present invention is applied into an RFID network, the second entity is a reader-, and the first entity is an electronic tag, so as to solve the problem of the authentication of the reader for the electronic tag in the RFID network. The reader distributes a shared key to the electronic tag. That is, the authentication of the reader for the electronic tag is implemented, and a shared master key is generated.

When the present invention is applied into a wireless local area network, the second entity is an access point and the first entity is a mobile terminal, so as to solve the problem of the authentication of the access point for the mobile terminal. The access point distributes a shared key to the mobile terminal. That is, the authentication of the access point for the mobile station is implemented, and a shared master key is generated.

When the present invention is applied into a wireless MAN, the second entity is a base station and the first entity is a mobile terminal, so as to solve the problem of the authentication of the base station for the mobile terminal in the wireless MAN. The base station distributes a shared key to the mobile terminal. That is, the authentication of the base station for the mobile terminal is implemented, and a shared master key is generated.

It can be seen from the above mentioned embodiments of the present invention that the authentication between the first entity and the second entity need not to pass through the authentication server, no secure channel needs to be established between the third entity with the first entity and the second entity, and the first entity and the second entity can implement the one-way authentication directly. In addition, combining an identity-based public key mechanism with a background identity validity authentication mechanism of WAPI further provides the following advantages: 1. The maintenance workload is low since the present invention is based on an identity public key mechanism and does not need to maintain a public key infrastructure (PKI) like the conventional public key; 2. Communication overhead is saved because no digital certificate needs to be transferred in the course of authentication, thus saving communication overhead; 3. The incorporation of the identity authentication function of the WAPI mechanism can avoid the disadvantage that it is difficult to perform identity validity verification in the identity-based public key mechanism; 4. Being different from the WAPI, in TTP signature of the identity verification process, both a conventional public key algorithm and an identity-based public key algorithm can be utilized so that the implementation of the signature is more flexible; and 5. By using bilinear pairings on an elliptic curve, the length of security data can be shortened without lowing security, thus greatly enhancing computation and communication performance.

What is claimed is:

1. A method of one-way access authentication, characterized in that the method comprises:

sending, by a second entity, an authentication request and key distribution packet to a first entity according to system parameters pre-set up by a third entity, and verifying, by the first entity, whether the authentication request and key distribution packet is valid, wherein the system parameters comprise: two q-order cyclic groups $(G_1, +)$ and $(G_2, \cdot)$ a generator P of $G_1$, a bilinear map e of $G_1$ and $G_2$ which is e: $G_1 \times G_2 \to G_2$, a randomly selected trusted third party private key $S_{TTP} \in Z^*_q$, and a corresponding public key $Q_{TTP} = S_{TTP} P \in G_1$;

generating, by the first entity, an authentication and key response packet and sending by the first entity the authentication and key response packet to the second entity when the authentication request and key distribution packet is valid, and verifying, by the second entity, whether the authentication and key response packet is valid;

generating, by the second entity, an authentication and key confirmation packet and sending by the second entity the authentication and key confirmation packet to the first entity when the authentication and key response packet is valid, and verifying, by the first entity, whether the authentication and key confirmation packet is valid; and determining that the authentication is successful and the key serves as an agreed master key when the authentication and key confirmation packet is valid.

2. The method according to claim 1, wherein the verifying by the first entity whether the authentication request and key distribution packet is valid comprises:

obtaining a decryption key and an integrity check key from a key ciphertext CKey field of the authentication request and key distribution packet by using a secret data SData field of the authentication request and key distribution packet and a private key of the first entity;

obtaining a second message integrity check code by using the integrity check key; and determining whether the second message integrity check code and a first message integrity check code in the authentication request and key distribution packet are identical.

3. The method according to claim 1, wherein the verifying by the first entity the validity of the authentication and key confirmation packet comprises:

determining whether a first random number used by the second entity in the authentication and key confirmation packet is a random number generated by the first entity, and determining whether a third message integrity check code in the authentication and key confirmation packet is valid when it is determined that the first random number is the random number generated by the first entity.

4. The method according to claim 1, wherein the first entity comprises an electronic tag or a mobile terminal.

5. The method according to claim 1, wherein the second entity comprises a reader, an access point or a base station.

6. The method according to claim 1, wherein the authentication request and key distribution packet consists of the following fields:

ID1, indicating identity information of the first entity,
ID2, indicating identity information of the second entity,
N2, indicating a random number generated by the second entity,
SData, indicating secret data,
CKey, indicating key ciphertext which encapsulates the ciphertext of a key Key to be sent to the first entity by the second entity, and
MIC1, indicating a message integrity check code obtained for the CKey field and all the fields before the CKey field.

7. The method according to claim 1, wherein the authentication and key response packet consists of the following fields:

ID1, indicating identity information of the first entity,
ID2, indicating identity information of the second entity, N1, indicating a random number generated by the first entity, N2', indicating a random number used by the first entity, and MIC2, indicating a message integrity check code obtained for the N2 field and all the fields before the N2 field by using a third integrity check key derived from a key Key.

8. The method according to claim 1, wherein the authentication and key confirmation packet consists of the following fields:

ID1, indicating identity information of the first entity,

ID2, indicating identity information of the second entity,

N1', indicating a random number generated by the second entity, and

MIC3, indicating a message integrity check code obtained for the N1 field and all the fields before the N1 field by using a third integrity check key derived from a key Key.

9. A method of one-way access authentication comprising:

sending, by a second entity, an authentication request and key distribution packet to a first entity according to system parameters pre-set up by a third entity, and verifying, by the first entity, whether the authentication request and key distribution packet is valid, wherein the system parameters comprise: two q-order cyclic groups $(G_1, +)$ and $(G_2, \cdot)$, a generator P of $G_1$, a bilinear map e of $G_1$ and $G_2$ which is e: $G_1 \times G_1 \to G_2$, a randomly selected trusted third party private key $S_{TTP} \in Z^*_q$, and a corresponding public key $Q_{TTP} = S_{TTP} P \in G_1$;

generating, by the first entity, an authentication and key response packet and sending by the first entity the authentication and key response packet to the second entity when the authentication request and key distribution packet is valid, and verifying, by the second entity, whether the authentication and key response packet is valid;

sending, by the second entity, an identity authentication request packet to the third entity when the authentication and key response packet is valid, and verifying, by the third entity, validity of identity of the first entity and sending by the third entity an identity authentication response packet to the second entity;

verifying, by the second entity, whether the identity of the first entity is correct according to the identity authentication response packet;

generating, by the second entity, an authentication and key confirmation packet and sending by the second entity the authentication and key confirmation packet to the first entity when the identity of the first entity is correct, and verifying, by the first entity, whether the authentication and key confirmation packet is valid; and determining that the authentication is successful and the key serves as an agreed master key when the authentication and key confirmation packet is valid.

10. The method according to claim 9, wherein the verifying by the first entity whether the authentication request and key distribution packet is valid comprises:

obtaining a decryption key and an integrity check key from a key ciphertext CKey field of the authentication request and key distribution packet by using a secret data SData field of the authentication request and key distribution packet and a private key of the first entity;

obtaining a second message integrity check code by using the integrity check key; and determining whether the second message integrity check code and a first message integrity check code in the authentication request and key distribution packet are identical.

11. The method according to claim 9, wherein the verifying by the first entity whether the authentication and key confirmation packet comprises:

determining whether a first random number used by the second entity in the authentication and key confirmation packet is a random number generated by the first entity, and determining whether a third message integrity check code in the authentication and key confirmation packet is valid when it is determined that the first random number is a random number generated by the first entity.

12. The method according to claim 9, wherein the first entity comprises an electronic tag or a mobile terminal.

13. The method according to claim 9, wherein the second entity comprises a reader, an access point or a base station.

14. The method according to claim 9, wherein the authentication request and key distribution packet consists of the following fields:

ID1, indicating identity information of the first entity,

ID2, indicating identity information of the second entity,

N2, indicating a random number generated by the second entity,

SData, indicating secret data,

CKey, indicating key ciphertext which encapsulates the ciphertext of a key Key to be sent to the first entity by the second entity, and MIC1, indicating a message integrity check code obtained for the CKey field and all the fields before the CKey field.

15. The method according to claim 9, wherein the authentication and key response packet consists of the following fields:

ID1, indicating identity information of the first entity,

ID2, indicating identity information of the second entity,

N1, indicating a random number generated by the first entity,

N2', indicating a random number used by the first entity, and

MIC2, indicating a message integrity check code obtained for the N2 field and all the fields before the N2 field by using a third integrity check key derived from a key Key.

16. The method according to claim 9, wherein the authentication and key confirmation packet consists of the following fields:

ID1, indicating identity information of the first entity,

ID2, indicating identity information of the second entity,

N1', indicating a random number generated by the second entity, and

MIC3, indicating a message integrity check code obtained for the N1 field and all the fields before the N1 field by using a third integrity check key derived from a key Key.

17. The method according to claim 9, wherein the identity authentication request packet consists of the following fields:

ID2, indicating identity information of the second entity,

TTP, indicating a trusted third party responsible for verifying identity validity of other devices, ID1, indicating identity information of the first entity, N1, indicating a random number generated by the first entity, and N2, indicating a random number generated by the second entity.

18. The method according to claim 9, wherein the identity authentication response packet consists of the following fields:

ID1, indicating identity information of the first entity,

ID2, indicating identity information of the second entity,

TTP, indicating a trusted third party responsible for verifying identity validity of other devices, N1, indicating a random number generated by the first entity, N2, indicating a random number generated by the second entity, RES1, indicating a result of a verification performed by the TTP on the validity of the identity of the first entity, and SigTTP, indicating a digital signature performed by the TTP on the RES1 field and all the fields before the RES1 field.

* * * * *